US008432569B2

(12) United States Patent
Yago

(10) Patent No.: US 8,432,569 B2
(45) Date of Patent: Apr. 30, 2013

(54) IMAGE FORMING SYSTEM, IMAGE FORMING APPARATUS AND RECORDING MEDIUM

(75) Inventor: Kazuya Yago, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 328 days.

(21) Appl. No.: 12/821,467

(22) Filed: Jun. 23, 2010

(65) Prior Publication Data

US 2010/0333183 A1 Dec. 30, 2010

(30) Foreign Application Priority Data

Jun. 24, 2009 (JP) ................... 2009-149414

(51) Int. Cl.
*G06F 3/12* (2006.01)
(52) U.S. Cl.
USPC ....... 358/1.15; 358/1.13; 358/1.14; 358/1.16; 726/2; 726/3
(58) Field of Classification Search ................. 358/1.13, 358/1.14, 1.15, 1.16; 726/2, 3
See application file for complete search history.

(56) References Cited

U.S. PATENT DOCUMENTS 6,701,331 B1 3/2004 Sawada et al.
7,400,427 B2 7/2008 Honma
2007/0041039 A1 2/2007 Doui

FOREIGN PATENT DOCUMENTS

| JP | 08-106393 | 4/1996 |
|---|---|---|
| JP | 11-312081 | 11/1999 |
| JP | 2004-220532 A | 8/2004 |
| JP | 2004-287735 | 10/2004 |
| JP | 2005-190298 | 7/2005 |
| JP | 2006-114423 | 4/2006 |
| JP | 2007-058316 A | 3/2007 |
| JP | 2007-286820 | 11/2007 |

OTHER PUBLICATIONS

Office Action (Notification of Reasons for Refusal) dated Apr. 26, 2011, issued in the corresponding Japanese Patent Application No. 2009-149414, and an English Translation thereof.

*Primary Examiner* — Vu B Hang
(74) *Attorney, Agent, or Firm* — Buchanan Ingersoll & Rooney PC

(57) ABSTRACT

An image forming system includes an image forming apparatus, an information processing apparatus and a printer driver generator that generates a printer driver and a unique authentication key for the printer driver. The information processing apparatus gives the unique authentication key to a job generated according to the printer driver currently installed thereon, and transmits them to the image forming apparatus. And the image forming apparatus executes the job if the authentication key received therefrom and an authentication key recorded in the image forming apparatus are identical.

19 Claims, 12 Drawing Sheets

| User | Full-color Printing | Monochrome Printing | 2-in-1 Printing | Both-side Printing | Version |
|---|---|---|---|---|---|
| A | O | O | × | O | Ver.2.0 |
| B | × | O | O | O | Ver.2.1 |
| C | × | O | × | O | Ver.2.1 |

IMAGE FORMING SYSTEM, IMAGE FORMING APPARATUS AND RECORDING MEDIUM

This application claims priority under 35 U.S.C. §119 to Japanese Patent Application No. 2009-149414 filed on Jun. 24, 2009, the entire disclosure of which is incorporated herein by reference in its entirety.

BACKGROUND OF THE INVENTION

1. Field of the Invention

The present invention relates to an image forming system in which an image forming apparatus and an information processing apparatus such as a personal computer are capable of being interconnected, an image forming apparatus preferably employed in this image forming system, and a computer readable recording medium.

2. Description of the Related Art

The following description sets forth the inventor's knowledge of related art and problems therein and should not be construed as an admission of knowledge in the prior art.

For recent years, an image forming system that generates customized printer drivers which functions are prohibited/permitted for individual users by a printer administrator and provides the printer drivers to the individual users, has been used. Such a printer driver has a default configuration and a user can change it. Alternatively, if a user cannot change the default configuration, he/she will become able to change it and apply the changed configuration to job execution by installing another printer driver, which has been a problem to be resolved.

To resolve this problem, there is a print control system as disclosed in Japanese Unexamined Laid-open Patent Publication No. 2004-220532. With this print control system, prohibited/permitted function information is stored in advance in a user's information processing terminal, and then the printer driver detects the prohibited/permitted function information before execution of a print job and determines as a print control condition the user's permitted function for execution of a print job based on the prohibited/permitted function information detected therefrom.

With this configuration, the user can be notified of his/her prohibited function for execution of a print job. Concretely, such a notice is given in a manner that prevents the user from selecting the prohibited function, thus the user never can give to a print apparatus, an instruction to execute a print job using the prohibited function. This could improve user operability, and also improve usefulness of the print apparatus since the print apparatus would never receive an instruction to execute a print job that should not be executed due to use of the prohibited function, uselessly.

And there is a print system as disclosed in Japanese Unexamined Laid-open Patent Publication No. 2007-058316. With this print system, when a printer driver is activated on a user's information processing terminal, prohibition/permission information stored in the user's information processing terminal is transmitted to a server having prohibition/permission information stored therein for individual users. And if the prohibition/permission information received therefrom and the prohibition/permission information stored in the server are identical, the server accepts a request to provide job information to a printer to make it execute a print job.

However, with the technology described in Japanese Unexamined Laid-open Patent Publication No. 2004-220532, since prohibited/permitted function information is stored in advance in a user's information processing terminal, the user can change the default information to give an instruction to execute a job without using the default information, on a purpose. This may cause a security problem.

And with the technology described in Japanese Unexamined Laid-open Patent Publication No. 2007-058316, a user's prohibition/permission information is checked by a server at least one time. This would make job execution slower.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an image forming system that is capable of ensuring security with a simple operation, by eliminating the inconveniences that a user can change a configuration of a printer driver and give an instruction to execute a job using the changed configuration, and a user's prohibition/permission information is checked by a server.

It is another object of the present invention to provide an image processing apparatus preferably employed in the image forming system.

It is yet another object of the present invention to provide a computer readable recording medium having a printer driver used by the image forming system, stored therein to make a computer execute processing.

According to a first aspect of the present invention, an image forming system includes an image forming apparatus, an information processing apparatus capable of being connected to the image forming apparatus, and a printer driver generator that generates a printer driver to set permitted operations of the image forming apparatus and a unique authentication key for the printer driver, and wherein:

the information processing apparatus comprises:
  a controller that installs on the information processing apparatus, the printer driver generated by the printer driver generator;
  an authentication key memory that records in itself the authentication key generated by the printer driver generator;
  a job generator that generates a job to give to the image forming apparatus, according to the printer driver currently installed thereon; and
  a transmitter that transmits to the image forming apparatus, the job generated by the job generator, having the authentication key, and the image forming apparatus comprises:
  an authentication key memory that records in itself the authentication key generated by the printer driver generator;
  a receiver that receives the job having the authentication key, from the information processing apparatus;
  a comparator that compares the authentication key given to the job received therefrom, to the authentication key recorded in the authentication key memory of the image forming apparatus; and a job executor that executes the received job if the authentication keys are identical according to a comparison result drawn by the comparator.

According to a second aspect of the present invention, an image forming apparatus includes:

a printer driver generator that generates a printer driver to set permitted operations of the image forming apparatus and a unique authentication key for the printer driver;

an authentication key memory that records in itself the authentication key generated by the printer driver generator;

a transmitter that transmits to an information processing apparatus, the printer driver and the authentication key generated by the printer driver generator;

a receiver that receives a job generated according to the printer driver and having the authentication key, from the information processing apparatus;

a comparator that compares the authentication key given to the job received therefrom, to the authentication key recorded in the authentication key memory; and a job executor that executes the job received therefrom if the authentication keys are identical according to a comparison result drawn by the comparator.

According to a third aspect of the present invention, a computer readable recording medium has a printer driver to set permitted operations of an image forming apparatus and generate a job to give to the image forming apparatus, recorded therein to make a computer of an information processing apparatus execute:

giving to a job, a unique authentication key generated for the printer driver, when the job is generated;

transmitting the job having the authentication key, to the image forming apparatus; and changing the unique authentication key given to the job, if a change occurs to the function of the printer driver.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
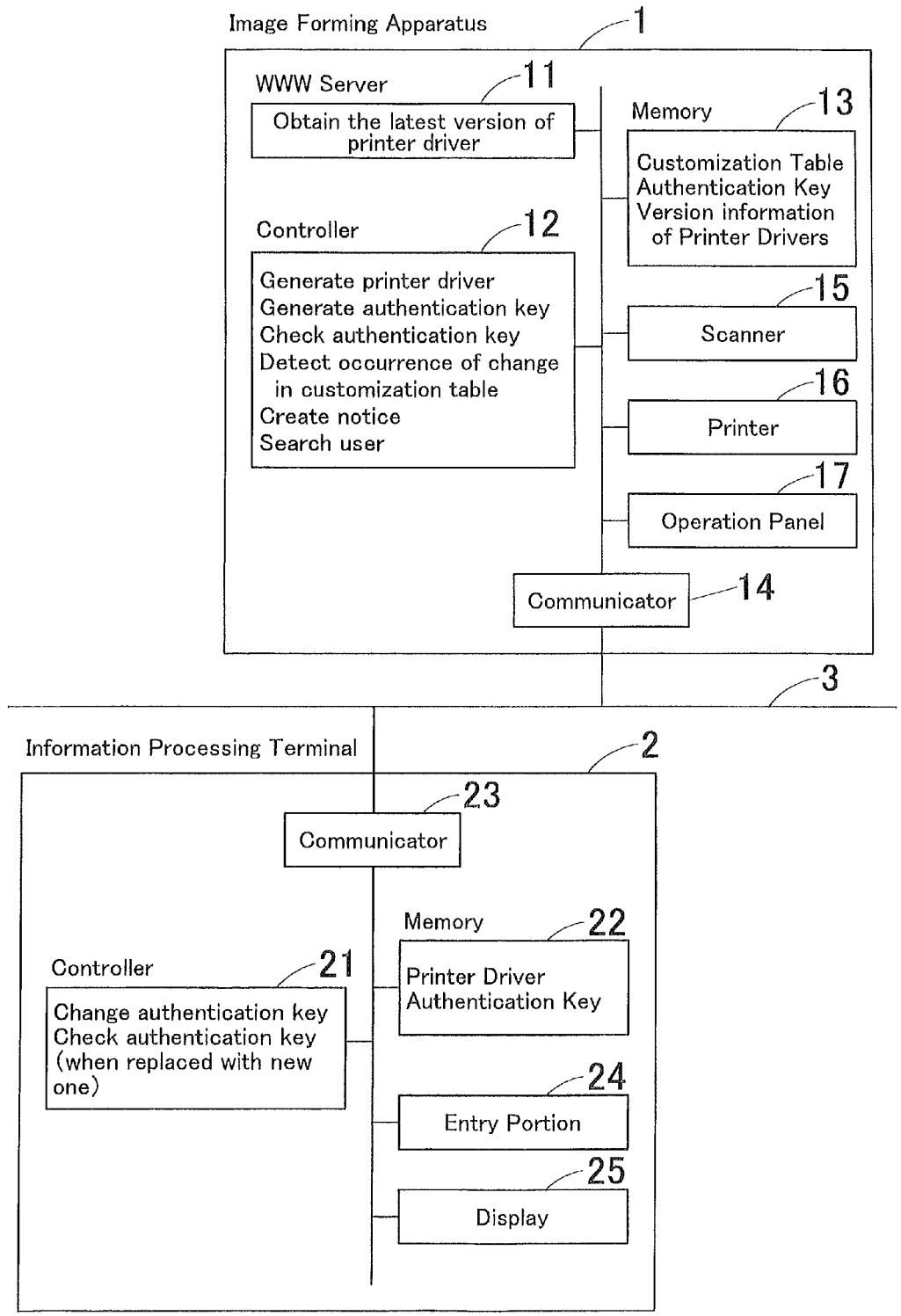
FIG. 1 is a block diagram schematically showing a configuration of an image forming system according to one embodiment of the present invention.

FIG. 1 is a block diagram schematically showing a configuration of an image forming system according to one embodiment of the present invention.

This image forming system includes an image forming apparatus 1 and an information processing terminal 2 that is an information processing apparatus, and the image forming apparatus 1 and the information processing terminal 2 are interconnected via a network 3.

The image forming apparatus 1 includes a Web server 11, a controller 12, a memory 13, a communicator 14, a scanner 15, a printer 16, an operation panel 17 and etc.

The Web server 11 obtains the latest version of printer driver by accessing a location where it is stored, via the Internet or another network on a regular basis.

The controller 12 centrally controls the entire image forming apparatus 1. In addition, the controller 12 generates printer drivers customized for individual users or sections such as groups, who use the information processing terminals 2, based on the latest version of printer driver obtained from the location as described above, and also generates unique authentication keys for the respective printer drivers. Specifically, in this embodiment, permitted operations are stored in advance in the image forming apparatus 1, for the individual users or sections such as groups, and the controller 12 generates printer drivers customized for the individual users or sections so as to enable the information processing terminals 2 to apply their permitted operations to job execution.

Furthermore, the controller 12 judges whether or not an authentication key received from the information processing terminal 2 together with a job is unique for a proper printer driver, by comparing the authentication key to the authentication key recorded in the memory 13. And then, based on a judgment result, the controller 12 judges whether or not to execute the job or judges whether or not any of the permitted operations is changed by an administrator or another person (in Figure, described as "whether or not there is a change in the customization table"). Meanwhile, if an authentication key received from the information processing terminal 2 together with a job is not unique for a proper printer driver, the controller 12 generates a message telling that it is not unique for a proper printer driver to transmit it to an administrator and/or the user who uses the information processing terminal 2 and gave an instruction to execute the job, and detects a predetermined user. These operations of controller 12 will be detailed later.

The controller 12 includes a CPU, a ROM recording an operation program for the CPU and other data, a RAM serving as a work area for the CPU to execute processing according to the operation program, and etc., which are not show in Figure.

The memory 13 is a recording medium such as a hard disk drive. It records in itself a table (the customization table) having the operations permitted by an administrator or another person, for individual users or sections as described above; unique authentication keys generated by the controller 12 for respective printer drivers when the controller 12 generates the printer drivers; version information of the printer drivers; job data received from the information processing terminal 2; image data read out from documents by the scanner 15; and other data.

The communicator 14 serves to exchange data with the information processing terminal 2, other image forming apparatuses and other devices via the network 3. In this embodiment, the communicator 14 transmits a printer driver and authentication key generated by the controller 12, to the information processing terminal 2, and receives therefrom a job having the authentication key.

The scanner 15 reads an image from a document to output image data obtained therefrom. The printer 16 prints out print data received from the information processing terminal 2, image data read out from a document by the scanner 15, and other data, serving as a job executor. The operation panel 17 is used for user entries and displays various messages. And it includes a display that is a liquid crystal display with touch-panel functionality and a key entry portion having a numeric key pad, a start key, a stop key and other keys.

Figures 2, 3:
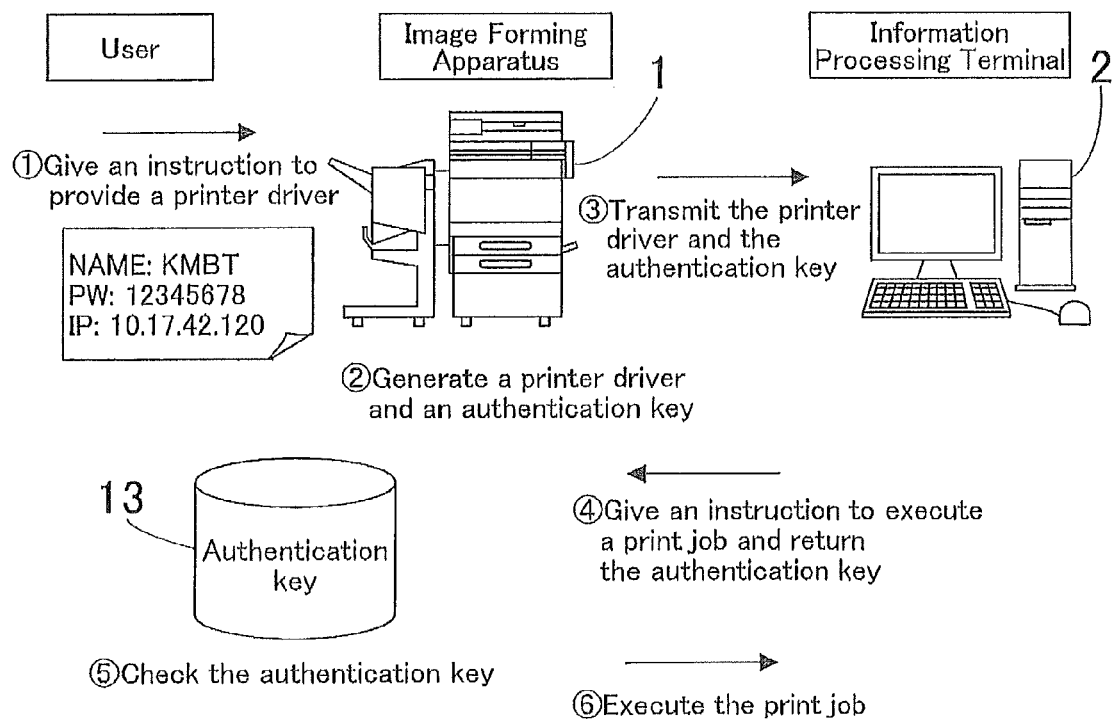
FIG. 2 is a customization table showing a list of the operations permitted for individual users.
FIG. 3 shows a view to explain all the operations of the image forming system shown in FIG. 1.

FIG. 2 is a customization table showing a list of the permitted operations for individual users, recorded in the memory 13. In this example, for User A, full-color printing, monochrome printing and both-side printing are permitted, meanwhile 2-in-1 printing to print two pages of document on one sheet is prohibited. Thus, a printer driver that permits full-color printing, monochrome printing and both-side printing but prohibits 2-in-1 printing, is transmitted to the User A's information processing terminal 2, then installed thereon.

For User B, full-color printing is prohibited, meanwhile monochrome printing, both-side printing and 2-in-1 printing are permitted. For User C, full-color printing and 2-in-1 printing are prohibited, meanwhile monochrome printing and both-side printing are permitted.

In this embodiment, version information of the printer drivers transmitted to the users' information processing terminals 2 is also recorded in this customization table.

The customization table of FIG. 2 may be recorded in an external recording medium, for example a database of an administration server, not in the memory 13 of the image forming apparatus 1.

The information processing terminal 2 is a personal computer. It includes a controller 21, a memory 22, a communicator 23, an entry portion 24, a display 25 and etc.

The controller 21 centrally controls the entire information processing terminal 2. Specifically, in this embodiment, the controller 21 installs a printer driver received from the image forming apparatus 1; records an authentication key received together with the printer driver in the memory 22; and generates a job to be given to the image forming apparatus 1, according to the printer driver currently installed thereon. Furthermore, if any of the functions of the printer driver is changed, the controller 21 changes the unique authentication key for the printer driver. Meanwhile, if a new version of printer driver is received from the image forming apparatus 1, the controller 21 performs authentication of the new version of printer driver, by comparing the unique authentication key for the old version of printer driver, also received together with the new version of printer driver, to the authentication key recorded in the memory 22.

The controller 21 includes a CPU, a ROM recording an operation program for the CPU and other data, a RAM serving as a work area for the CPU to execute processing according to the operation program, and etc., which are not shown in Figure.

The memory 22 records in itself a printer driver installed by the controller 21, a unique authentication key for the printer driver, and other data.

The communicator 23 serves to exchange data with the image forming apparatus 1 and other devices via the network 3. In this embodiment, the communicator 23 receives a printer driver and an authentication key from the image forming apparatus 1 and returns thereto a job having the authentication key.

The entry portion 24 is used for user entries and includes a keyboard, a mouse and etc. The display 25 is a liquid crystal display or etc.

Hereinafter, all operations of the image forming system shown in FIG. 1 will be explained with reference to FIG. 3.

First of all, a user who uses the information processing terminal 2 enters a user name, a password and an IP address of the information processing terminal 2 and gives an instruction to provide a printer driver to the information processing terminal 2, by operating the operation panel 17 of the image forming apparatus 1 (Circled Number 1).

And the image forming apparatus 1 generates a printer driver customized for the user and a unique authentication key for the printer driver, based on the customization table of FIG. 2 including his/her permitted operations (Circled Number 2). The authentication key is stored in the customization table of the image forming apparatus 1.

Subsequently, the image forming apparatus 1 transmits the generated printer driver and authentication key to the information processing terminal 2 (Circled Number 3).

Receiving them, the information processing terminal 2 installs the printer driver in the memory 22 and stores the authentication key also in the memory 22.

The user gives an instruction to execute a print job to the image forming apparatus 1, using the printer driver installed therein. Then the print job having the authentication key is transmitted to the image forming apparatus 1 (Circled Number 4).

Receiving the print job having the authentication key, the image forming apparatus 1 judges whether or not it is an authentication key for a proper printer driver, by comparing the authentication key to the authentication key stored in the memory 13 (Circled Number 5).

If these authentication keys are identical and it is an authentication key for a proper printer driver, the image forming apparatus 1 executes the print job (Circled Number 6).

As described above, the image forming apparatus 1 has a unique authentication key for a printer driver, recorded in advance in the memory 23. Receiving a job having an authentication key from the information processing terminal 2, the image forming apparatus 1 compares the authentication key given to the received job, to the authentication key recorded in advance, and then executes the job if these authentication keys are identical. Meanwhile, if these authentication keys are not identical, the image forming apparatus 1 prohibits execution of the job and transmits a notice telling that the authentication keys are not identical, to an administrator or the user who uses the information processing terminal 2, by electronic mail or another method. And thus, the administrator or the user who uses the information processing terminal 2 can know that the printer driver currently installed on the information processing terminal 2 is not proper and execution of the job is prohibited due to the improper printer driver.

As described above, if the authentication key given to the received job and the authentication key recorded in advance in the image forming apparatus 1 are not identical, the image forming apparatus 1 never executes the job. Therefore, even if a user who uses the information processing terminal 2 gives an instruction to execute a job using a printer driver improperly obtained from somewhere, the image forming apparatus 1 never executes the job since the job has no authentication key, or alternatively has an authentication key not identical with the authentication key recorded in the image forming apparatus 1. This could ensure higher security. Furthermore, this could shorten the time required for job execution since a server does not have to check the user's prohibition/permission information like in the conventional way.

Figure 4:
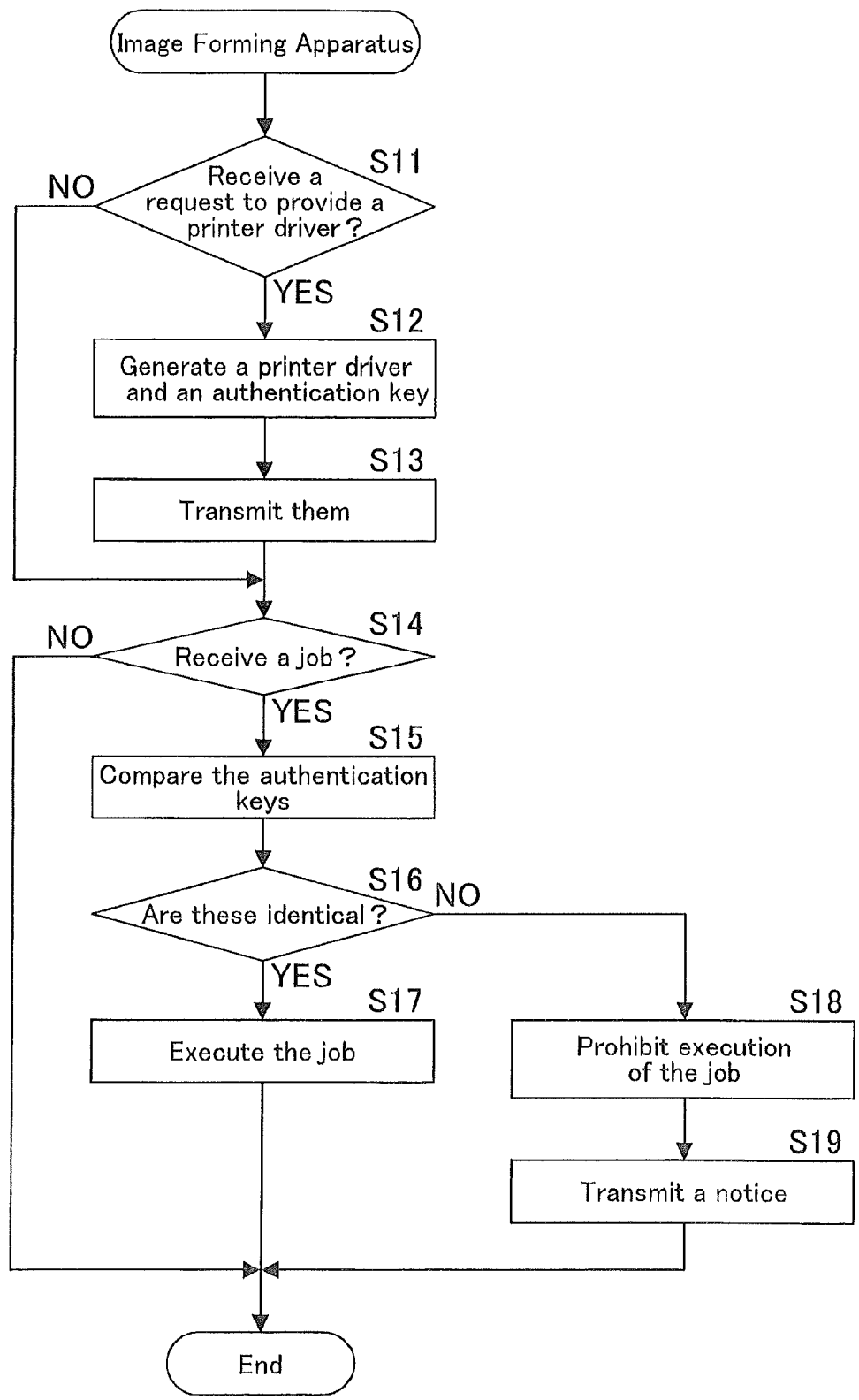
FIG. 4 is a flowchart representing a procedure executed in an image forming apparatus of the embodiment illustrated in FIG. 3.

FIG. 4 is a flowchart representing a procedure executed in the image forming apparatus 1, in the embodiment described with reference to FIG. 3. This procedure is executed by the CPU of the controller 12 according to an operation program.

A user operates the operation panel 17. Then it is judged in Step S11, whether or not a request to provide a printer driver is received. If it is not received (NO in Step S11), the routine proceeds to Step S14. If it is received (YES in Step S11), a printer driver and an authentication key are generated in Step S12, and the generated printer driver and authentication key are transmitted to the information processing terminal 2 in Step S13. After that, the routine proceeds to Step S14.

In Step S14, it is judged whether or not a job is received from the information processing terminal 2. If it is not received (NO in Step S14), the routine immediately terminates. If a job is received (YES in Step S14), an authentication key given to the job is compared to the authentication key stored in the image forming apparatus 1, in Step S15. And it is judged in Step S16, whether or not these authentication keys are identical.

If these are identical (YES in Step S16), the job is executed in Step S17. If these are not identical (NO in Step S16), execution of the job is prohibited in Step S18. After that, a notice telling that the authentication keys are not identical is transmitted to an administrator and/or the user who uses the information processing terminal 2 and gave an instruction to execute the job, by electronic mail or another method, in Step S19.

Figure 5:
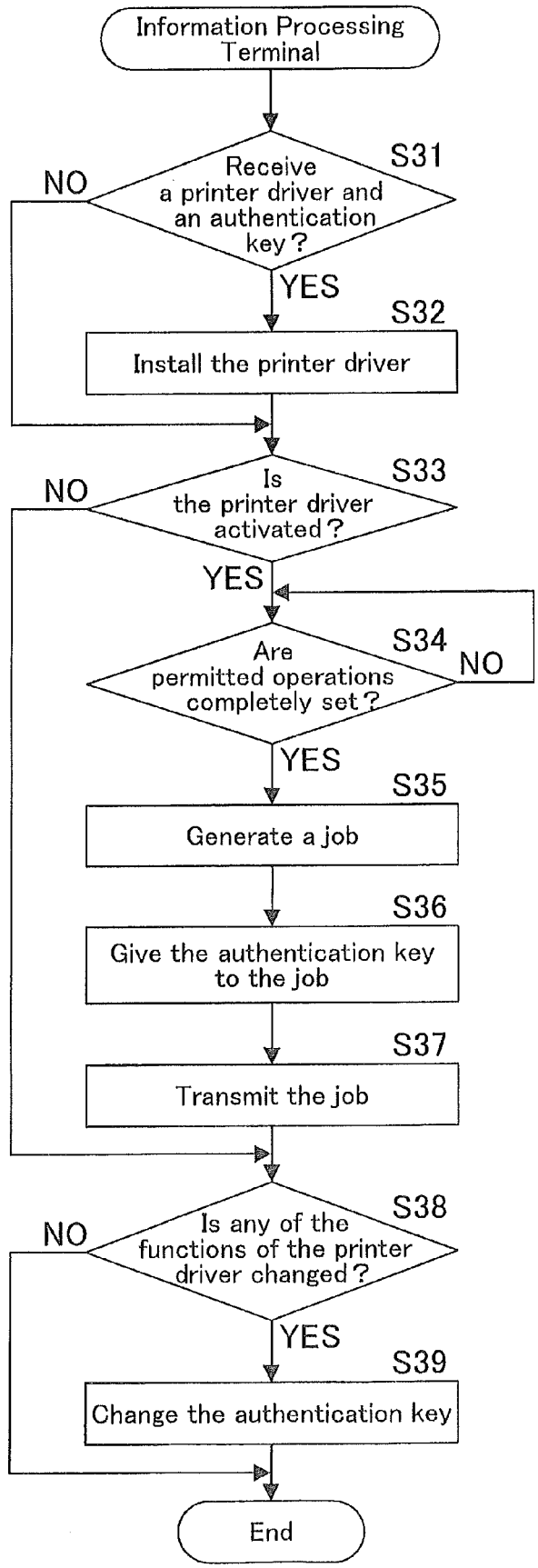
FIG. 5 is a flowchart representing a procedure executed in an information processing terminal in the embodiment illustrated in FIG. 3.

FIG. 5 is a flowchart representing a procedure executed in the information processing terminal 2, in the embodiment described with reference to FIG. 3. This procedure is executed by the controller 21 of the information processing terminal 2 according to a program recorded in the ROM or the memory 22.

In Step S31, it is judged whether or not a printer driver and an authentication key are received from the image forming apparatus 1. If these are not received (NO in Step S31), the routine proceeds to Step S33. If these are received (YES in Step S31), the printer driver is installed and the authentication key is stored in the memory 22, in Step S32. After that, the routine proceeds to Step S33.

In Step S33, it is judged whether or not the printer driver is activated. If it is not activated (NO in Step S33), the routine proceeds to Step S38. If it is activated (YES in Step S33), the routine waits until permitted operations are completely set using the printer driver, in Step S34. If permitted operations are completely set (YES in Step S34), a job is generated based on the permitted operations. Subsequently, the authentication key is given to the generated job in Step S36, and the job is transmitted in Step S37. After that, the routine proceeds to Step S38.

In Step S38, it is judged whether or not any of the functions of the printer driver is changed. If any of them is not changed (NO in Step S38), the routine immediately terminates. If any of them is changed (YES in Step S38), the authentication key is also changed in Step S39, then the routine terminates.

The new authentication key will be given to a job to be generated next, and the job will be transmitted to the image forming apparatus 1. However, execution of the job will be prohibited since the new authentication key is different from the authentication key stored in the image forming apparatus 1. This would eliminate the inconvenience that users can use an improper printer driver, and ensure higher security.

As shown in FIG. 5, Steps S33 through S39 of this procedure are executed according to the printer driver.

Figure 6:
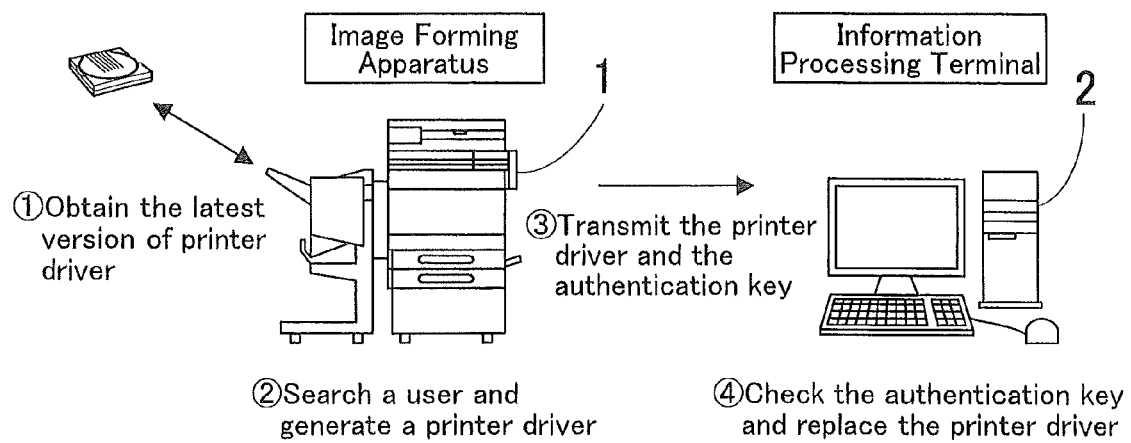
FIG. 6 relates to another embodiment of the present invention, showing a view to explain all the operations of the image forming system.

FIG. 6 shows another embodiment of the present invention. In this embodiment, if a new version of printer driver comes out (hereinafter, also will be referred to as "a printer driver is upgraded"), the old version of printer driver currently installed on the information processing terminal 2 used by a user, is replaced with the new one.

And thus, even if a printer driver customized for a user is installed and then upgraded, the user can use the latest version of printer driver having an authentication key.

As shown in FIG. 6, the image forming apparatus 1 obtains the latest version of printer driver via the Internet (Circled Number 1). The obtaining process is performed on a regular basis.

Subsequently, the image forming apparatus 1 detects a user who uses the old version of printer driver, based on the version information stored in the customization table of FIG. 2, and generates a new version of printer driver customized for the detected user and a unique authentication key for the new version of printer driver (Circled Number 2).

And the image forming apparatus 1 transmits the new version of printer driver and the new authentication key to the user who uses the old version of printer driver (Circled Number 3). At the same time, the image forming apparatus 1 also transmits thereto the old authentication key (the unique authentication key for the old version of printer driver).

The information processing terminal 2 receives the new version of printer driver and the new authentication key from the image forming apparatus 1. After receiving them, the information processing terminal 2 judges whether or not the old authentication key received from the image forming apparatus 1 and the unique authentication key for the printer driver currently installed on the information processing terminal 2 are identical. If these authentication keys are identical, the old version of printer driver currently installed thereon is replaced with the new one (Circled Number 4). And accordingly, the old authentication key is also replaced with the new one.

If these authentication keys are not identical, the printer driver currently installed on the information processing terminal 2 is not replaced with the new one, since there is a possibility that it is not a proper printer driver.

Figure 7:
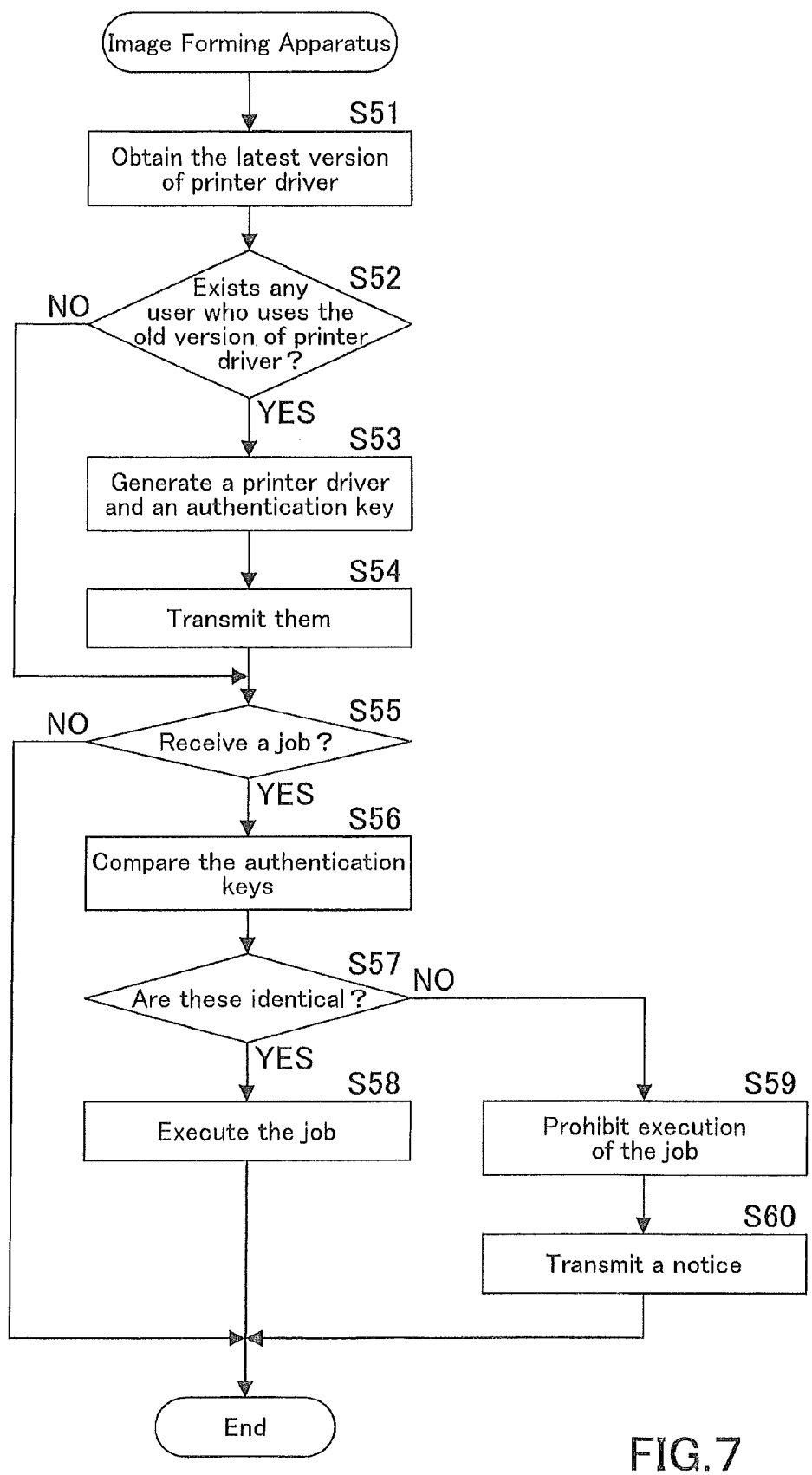
FIG. 7 is a flowchart representing a procedure executed in the image forming apparatus of the embodiment illustrated in FIG. 6.

FIG. 7 is a flowchart representing a procedure executed in the image forming apparatus 1 in the embodiment described with reference to FIG. 6. This procedure is executed by the CPU of the controller 12 according to an operation program.

On the side of the image forming apparatus 1, the latest version of printer driver is obtained via the Internet or another network, in Step S51. Then it is judged in Step S52, whether or not there exists a user who uses the old version of printer driver. If a user who uses the old version of printer driver is not detected (NO in Step S52), the routine proceeds to Step S55. If such a user is detected (YES in Step S52), a printer driver and an authentication key are generated in Step S53, and the generated printer driver and authentication key are transmitted to the information processing terminal 2, in Step S54. After that, the routine proceeds to Step S55.

In Step S55, it is judged whether or not a job is received from the information processing terminal 2. If a job is not received (NO in Step S55), the routine immediately terminates. If a job is received (YES in Step S55), an authentication key given to the job is compared to the authentication key stored in the image forming apparatus 1, in Step S56. And it is judged in Step S57, whether or not these authentication keys are identical.

If these are identical (YES in Step S57), the job is executed in Step S58. If these are not identical (NO in Step S57), execution of the job is prohibited in Step S59. After that, a notice telling that execution of the job is prohibited is transmitted to an administrator and/or the user who uses the information processing terminal 2 and gave an instruction to execute the job, by electronic mail or another method, in Step S60.

The image forming system can be configured such that the image forming apparatus 1 judges based on the customization table of FIG. 2, whether or not more operations of the image forming apparatus 1 are permitted for the user, using the new version of printer driver, and if more operations are permitted, the image forming apparatus 1 transmits to an administrator or another person, a notice telling that more operations are permitted for the user, after execution of the job, for example. Receiving this notice, the administrator or another person can change the prohibition/permission information recorded in the customization table of FIG. 2.

Figure 8:
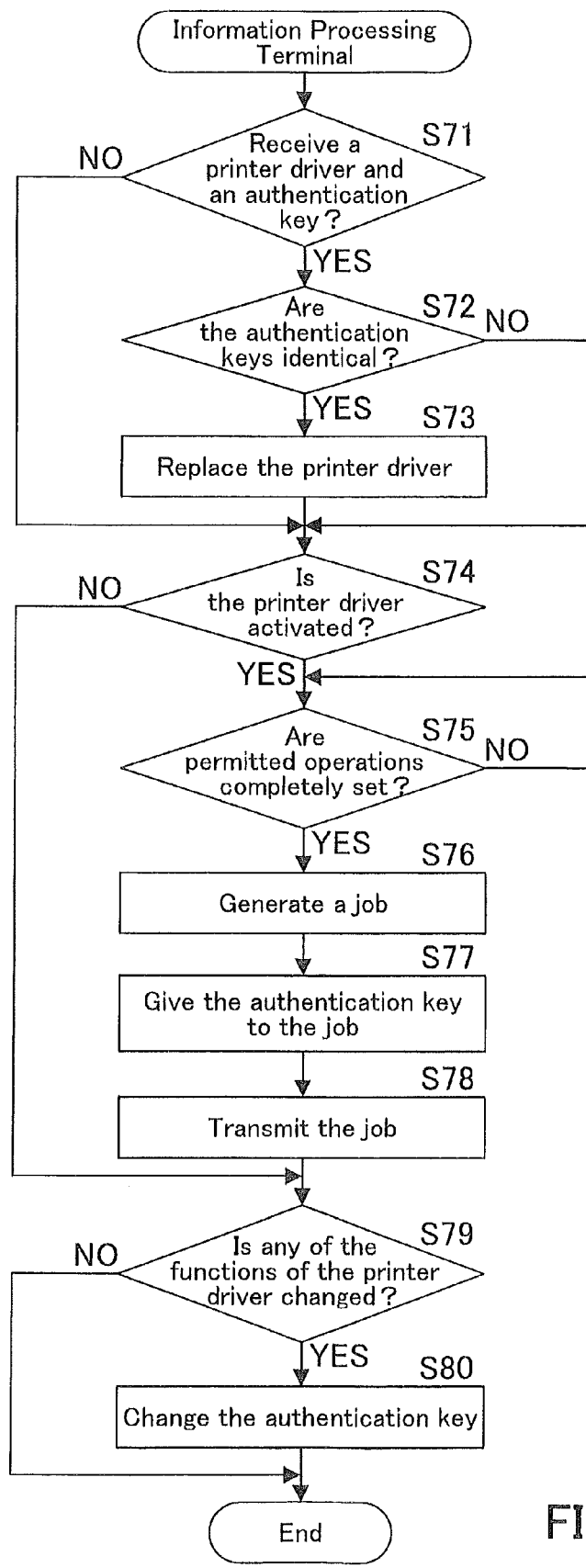
FIG. 8 is a flowchart representing a procedure executed in the information terminal apparatus of the embodiment illustrated in FIG. 6.

FIG. 8 is a flowchart representing a procedure executed in the information processing terminal 2, in the embodiment described with reference to FIG. 6. This procedure is executed by the controller 21 of the information processing terminal 2 according to a program recorded in the ROM or the memory 22.

In Step S71, it is judged whether or not a printer driver and an authentication key are received from the image forming apparatus 1. If these are not received (NO in Step S71), the routine proceeds to Step S74. If these are received (YES in Step S71), a unique authentication key for the old version of printer driver (the currently used printer driver) is compared to the authentication key stored in the information processing terminal 2, and it is judged in Step S72, whether or not these authentication keys are identical. If these are not identical (NO in Step S72), the routine proceeds to Step S74. If these are identical (YES in Step S72), the printer driver currently installed on the information processing terminal 2 is replaced with the new one in Step S73. After that, the routine proceeds to Step S74.

In Step S74, it is judged whether or not the printer driver is activated. If it is not activated (NO in Step S74), the routine proceeds to Step S79. If it is activated (YES in Step S74), the routine waits until permitted operations are completely set using the printer driver, in Step S75. If these are completely set (YES in Step S75), a job is generated based on the permitted operations in Step S76. Subsequently, the authentication key is given to the job in Step S77, and the job is transmitted in Step S78. Then the routine proceeds to Step S79.

In Step S79, it is judged whether or not any of the functions of the printer driver is changed. If any of them is not changed (NO in Step S79), the routine immediately terminates. If any of them is changed (YES in Step S79), the authentication key is also changed in Step S80, then the routine terminates.

As shown in FIG. 8, Steps S74 through S80 of this procedure are executed according to the printer driver.

Figure 9:
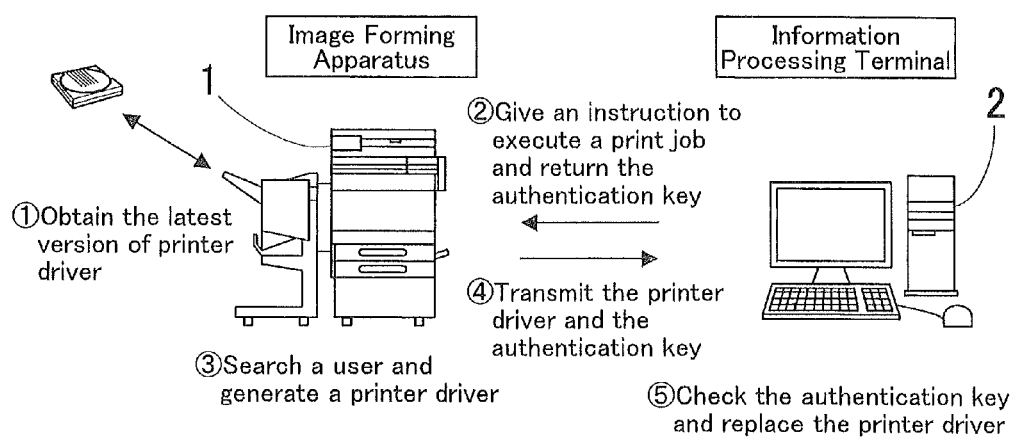
FIG. 9 relates to yet another embodiment of the present invention, showing a view to explain all the operations of the image forming system.

FIG. 9 shows yet another embodiment of the present invention. In this embodiment, if a printer driver is upgraded, the old version of printer driver currently installed on the information processing terminal 2 used by a user is replaced with the new one just like the embodiment described with reference to FIG. 9. However, the image forming apparatus 1 transmits the new version of printer driver and a new authentication key to the information processing terminal 2, at the time of receiving a job from the information processing terminal 2.

As shown in FIG. 9, the image forming apparatus 1 obtains the latest version of printer driver via the Internet (Circled Number 1). The obtaining process is performed on a regular basis.

Subsequently, the image forming apparatus 1 waits until receiving a job from the information processing terminal 2. Receiving a job from the information processing terminal 2 (Circled Number 2), the image forming apparatus 1 judges whether or not the user who gave an instruction to execute the job uses the old version of printer driver, based on the version information recorded in the customization table of FIG. 2. And if the user uses it, a new version of printer driver customized for the user and a unique authentication key for the printer driver are generated (Circled Number 3).

And the image forming apparatus 1 transmits the new version of printer driver and the new authentication key to the user (Circled Number 4). At the same time, the image forming apparatus 1 also transmits thereto the old authentication key (the unique authentication key for the old version of printer driver).

The information processing terminal 2 receives the new version of printer driver and the new authentication key from the image forming apparatus 1. After receiving them, the information processing terminal 2 judges whether or not the old authentication key received from the image forming apparatus 1 and a unique authentication key for the printer driver currently installed on the information processing terminal 2 are identical. If these authentication keys are identical, the old version of printer driver currently installed thereon is replaced with the new one (Circled Number 5). And accordingly, the old authentication key is also replaced with the new one.

If these authentication keys are not identical, the printer driver currently installed on the information processing terminal 2 is not replaced with the new one, since there is a possibility that it is not a proper printer driver.

Figure 10:
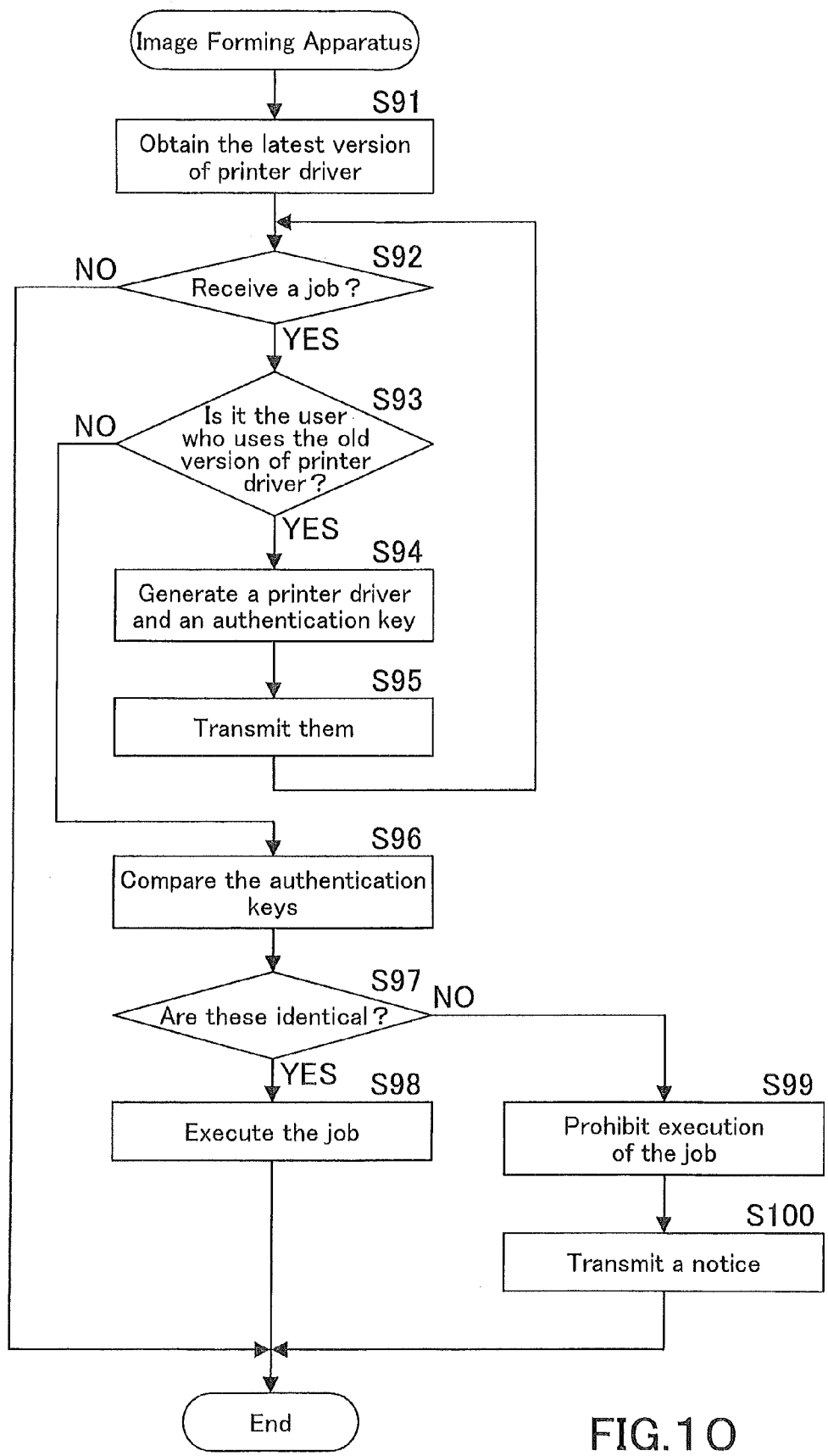
FIG. 10 is a flowchart representing a procedure executed in the image forming apparatus of the embodiment illustrated in FIG. 9.

FIG. 10 is a flowchart representing a procedure executed in the image forming apparatus 1, in the embodiment described with reference to FIG. 9. This procedure is executed by the CPU of the controller 12 according to an operation program.

On the side of the image forming apparatus 1, the latest version of printer driver is obtained via the Internet or another network, in Step S91. Then it is judged in Step S92, whether or not a job is received.

If a job is not received (NO in Step S92), the routine immediately terminates. If a job is received (YES in Step S92), then it is judged in Step S93, whether or not the user who gave an instruction to execute the job uses the old version of printer driver, based on the customization table of FIG. 2. If the user does not use it (NO in Step S93), the routine proceeds to Step S96, since the new version of printer driver is already installed on the user's information processing terminal 2. If the user uses it (YES in Step S93), a printer driver and an authentication key are generated in Step S94, and the generated printer driver and authentication key are transmitted to the information processing terminal 2, in Step S95. After that, the routine goes back to Step S92.

Meanwhile, in Step S96, an authentication key given to the job is compared to the authentication key stored in the image forming apparatus 1. And it is judged in Step S97, whether or not these authentication keys are identical.

If these are identical (YES in Step S97), the job is executed in Step S98. If these are not identical (NO in Step S97), execution of the job is prohibited in Step S99. After that, a notice telling that execution of the job is prohibited is transmitted to an administrator and/or the user who gave an instruction to execute the job, by electronic mail or another method, in Step S100.

As described above, in this embodiment, the image forming apparatus 1 transmits a new version of printer driver to the information processing terminal 2 at the time of receiving a job. Thus, the user who uses the information processing terminal 2 can easily know that the printer driver is upgraded.

The image forming system can be configured such that the image forming apparatus 1 judges whether or not more operations are permitted for the user, using the new version of printer driver, and if more operations are permitted, the image forming apparatus 1 transmits to an administrator or another person, a notice telling that more operations are permitted for the user, after execution of the job, for example.

Receiving the new version of printer driver and the new authentication key, the information processing terminal 2 replaces the old version of printer driver with the new one, generates a job and performs other operations, according to the procedure explained with the flowchart shown in FIG. 8.

Figure 11:
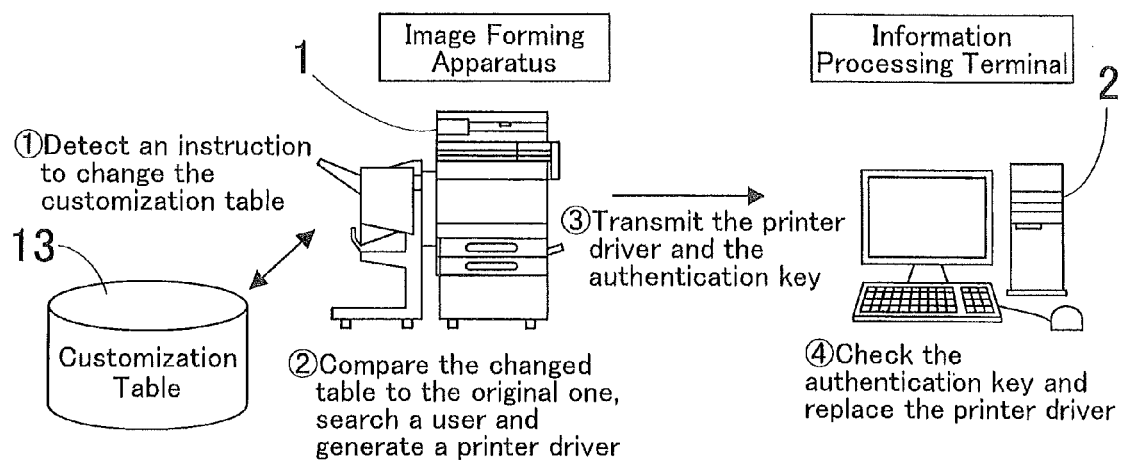
FIG. 11 relates to still yet another embodiment of the present invention, showing a view to explain all the operations of the image forming system.

FIG. 11 shows still yet another embodiment of the present invention. In this embodiment, if any of the operations permitted for individual users or sections, recorded in the customization table of FIG. 2, is changed by an administrator or another person, the image forming apparatus 1 transmits a printer driver having the function of applying the changed permitted operation, to the information processing terminal 2 used by the user or the section whose permitted operation is changed. And thus, even if any change occurs in the customization table of FIG. 2 after installation of the printer driver, a printer driver generated based on the latest customization table can be used.

As shown in FIG. 11, an administrator or another person gives an instruction to change the customization table, by operating the operation panel 17 of the image forming apparatus 1 or the administrator's terminal apparatus. Then, the image forming apparatus 1 detects the operation (Circled Number 1).

Subsequently, the image forming apparatus 1 detects a user whose permitted operation is changed, by comparing the changed customization table to the original one, and generates a new printer driver customized for the detected user and a unique authentication key for the new printer driver (Circled Number 2).

And the image forming apparatus 1 transmits the generated new printer driver and authentication key to the detected user (Circled Number 3). At the same time, the image forming apparatus 1 also transmits thereto the old authentication key (the unique authentication key for the old printer driver).

The information processing terminal 2 receives the new printer driver and authentication key from the image forming apparatus 1. After receiving them, the information processing terminal 2 judges whether or not the old authentication key received from the image forming apparatus 1 and a unique authentication key for the printer driver currently installed on the information processing terminal 2 are identical. If these authentication keys are identical, the printer driver currently installed thereon is replaced with the new one (Circled Number 4). And accordingly, the old authentication key is also replaced with the new one.

If these authentication keys are not identical, the printer driver currently installed on the information processing terminal 2 is not replaced with the new one, since there is a possibility that it is not a proper printer driver.

Figure 12:
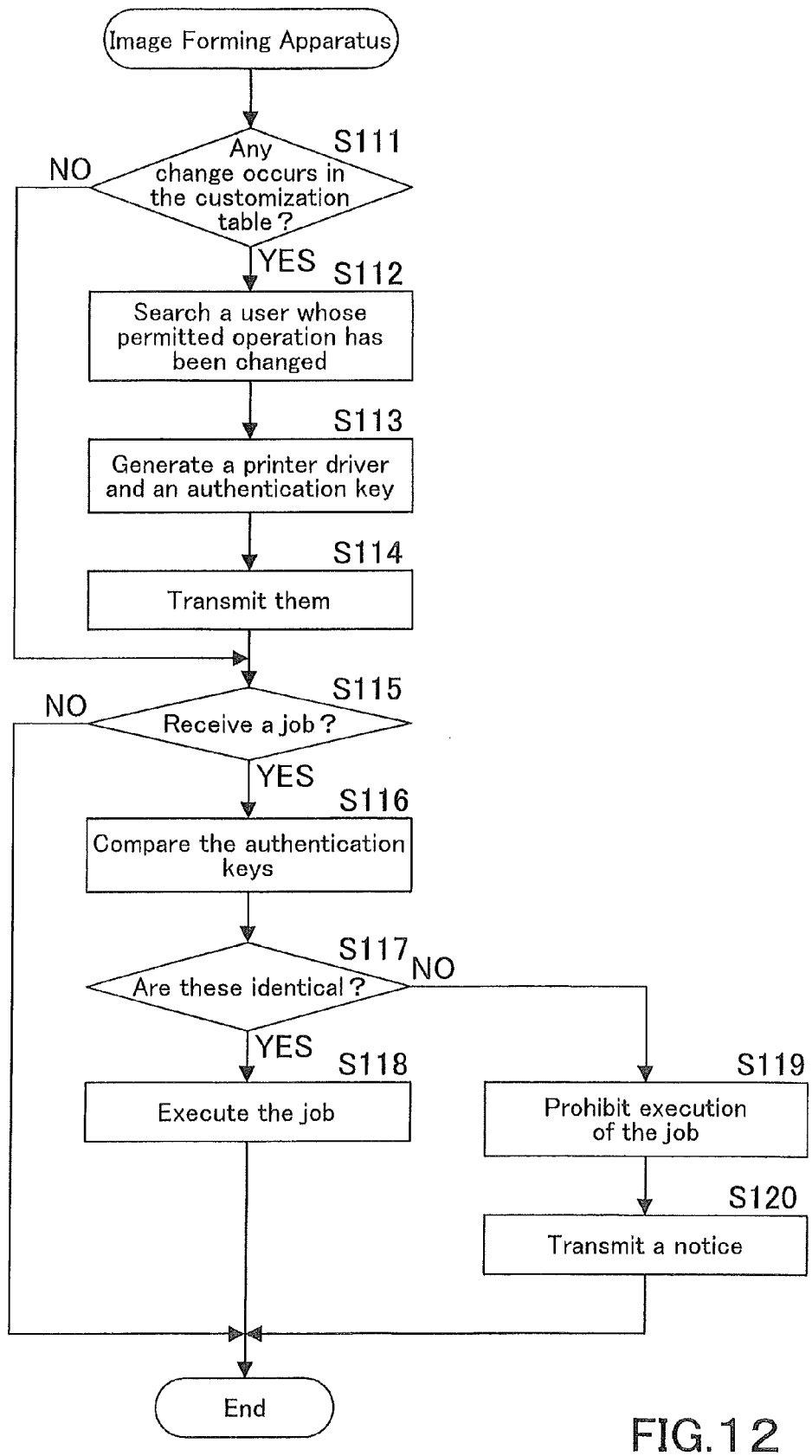
FIG. 12 is a flowchart representing a procedure executed in the image forming apparatus of the embodiment illustrated in FIG. 11.

FIG. 12 is a flowchart representing a procedure executed in the image forming apparatus 1, in the embodiment described with reference to FIG. 11. This procedure is executed by the CPU of the controller 12 according to an operation program.

On the side of the image forming apparatus 1, it is judged in Step S111, whether or not any change occurs in the customization table. If no change occurs (NO in Step S111), the routine proceeds to Step S115. If any change occurs (YES in Step S111), a user whose permitted operation has been changed is detected. And a printer driver customized for the detected user and an authentication key for the printer driver are generated in Step S113, and the generated printer driver and authentication key are transmitted to the information processing terminal 2 in Step S114. After that, the routine proceeds to Step S115.

In Step S115, it is judged whether or not a job is received from the information processing terminal 2. If a job is not received (NO in Step S115), the routine immediately terminates. If a job is received (YES in Step S115), an authentication key given to the job is compared to the authentication key stored in the image forming apparatus 1 in Step S116, and it is judged in Step S117, whether or not these authentication keys are identical.

If these are identical (YES in Step S117), the job is executed in Step S118. If these are not identical (NO in Step S117), execution of the job is prohibited in Step S119. After that, a message telling that the authentication keys are not identical is transmitted to an administrator and/or the user who uses the information processing terminal 2 and gave an instruction to execute the job, by electronic mail or another method, in Step S120.

Each described above relates to one embodiment of the present invention. However, the present invention does not necessarily limited to these embodiments described above.

Figure 13:
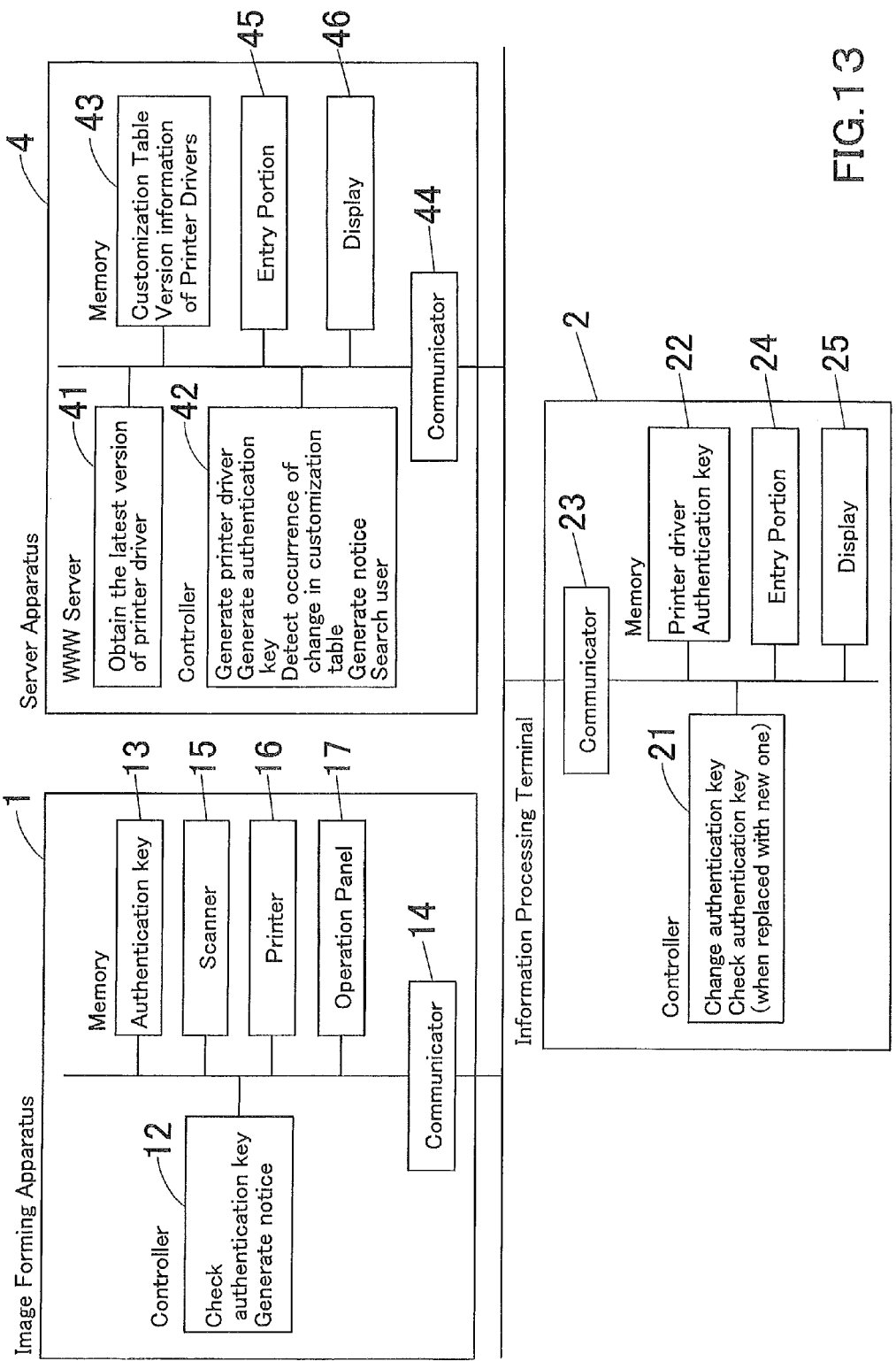
FIG. 13 is a block diagram showing a configuration of the image forming system according to further still yet another embodiment of the present invention.

For example, in these embodiments, the image forming apparatus 1 stores the customization table of FIG. 2, obtains the latest version of printer driver, generates and transmits a printer driver and an authentication key, detects a user who will receive the generated printer driver and authentication key, and performs other operations. Alternatively, as shown in FIG. 13, an administration sever 4 that is a personal computer or etc. connected to the image forming apparatus 1 and the information processing terminal 2 via the network 3, may store the customization table of FIG. 2, obtains the latest version of printer driver, generates and transmits a printer driver and an authentication key, detects a user who will receive the generated printer driver and authentication key, and performs other operations. In this case, it is only required for the image forming apparatus 1, to prohibit/permit job execution when receives a job and transmit a notice to an administrator or another person if job execution is prohibited.

The administration server 4 includes a Web server 41, a controller 42, a memory 43, a communicator 44, an entry portion 45 having a keyboard, a mouse and etc., a display 46 such as a liquid crystal display.

The Web server 41 obtains the latest version of printer driver, by accessing a location where it is stored, via the Internet or another network on a regular basis.

The controller 42 centrally controls the entire administration server 4. In addition, the controller 42 generates printer drivers customized for individual users or sections such as groups, who use the information processing terminals 2, based on the latest version of printer driver obtained from the location as described above, also generates unique authentication keys for the respective printer drivers, and detects users who will receive the generated printer drivers. And the controller 42 includes a CPU, a ROM recording an operation program for the CPU and other data, a RAM serving as a work area for the CPU to execute processing according to the operation program, and etc., which are not shown in Figure.

The memory 43 is a recording medium such as a hard disk drive. It records operations permitted for individual users or sections by an administrator or another person, as described above, unique authentication keys for the printer drivers, generated with the printer drivers by the controller 42, version information of the printer drivers, and other information.

The communicator 44 serves to exchange data with the image forming apparatus 1 and the information processing terminal 2 via the network 3.

The codes given in FIG. 13, which are the same as those in the image forming system of FIG. 1 represent the same components of a configuration, and detailed explanation thereof is omitted.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image forming system comprising an image forming apparatus, an information processing apparatus capable of being connected to the image forming apparatus, and a printer driver generator that generates a printer driver to set permitted operations of the image forming apparatus and a unique authentication key for the printer driver, and wherein:
   the information processing apparatus comprises:
      a controller that installs on the information processing apparatus, the printer driver generated by the printer driver generator;
      an authentication key memory that records in itself the authentication key generated by the printer driver generator;
      a job generator that generates a job to give to the image forming apparatus, according to the printer driver currently installed thereon; and
      a transmitter that transmits to the image forming apparatus, the job generated by the job generator, having the authentication key, and
   the image forming apparatus comprises:
      an authentication key memory that records in itself the authentication key generated by the printer driver generator;
      a receiver that receives the job having the authentication key, from the information processing apparatus;
      a comparator that compares the authentication key given to the job received therefrom, to the authentication key recorded in the authentication key memory of the image forming apparatus; and
      a job executor that executes the received job if the authentication keys are identical according to a comparison result drawn by the comparator.

2. The image forming system recited in claim 1, wherein:
   if the printer driver is upgraded, the printer driver generator generates a new version of printer driver and a new authentication key and transmits them to the information processing apparatus;
   the information processing apparatus installs thereon the new version of printer driver, and records the new authentication key in the authentication key memory of the information processing apparatus; and
   the image forming apparatus records the new authentication key generated for the new version of printer driver, in the authentication key memory of the image forming apparatus.

3. The image forming system recited in claim 2, further comprising:
   a version memory that records in itself version information of the printer drivers by user or section, and
   wherein:
      if a printer driver is upgraded, the printer driver generator detects a user or section who uses the old version of printer driver, based on the version information recorded in the version memory, and transmits the new version of printer driver and the new authentication key to the detected user's or section's information processing apparatus, together with the unique authentication key generated for the old version of printer driver; and the controller of the information processing apparatus compares the unique authentication key generated for the old version of printer driver, received from the printer driver generator, to the authentication key recorded in the authentication key memory of the information processing apparatus, and then replaces the old version of printer driver with the new one if the authentication keys are identical.

4. The image forming system recited in claim 2, further comprising:
a permitted operation memory that records in itself, the permitted operations of the image forming apparatus, by user or section;
a detector that detects a user or section whose permitted operations set using the new version of printer driver exist more than the user's or section's permitted operations recorded in the permitted operation memory; and
a notifier that transmits to an administrator of the permitted operations, a request to change the permitted operations recorded in the permitted operation memory, set for the detected user or section.

5. The image forming system recited in claim 1, further comprising:
a permitted operation memory that records in itself, the permitted operations of the image forming apparatus, by user or section; and
a judger that judges whether or not any of the permitted operations recorded in the permitted operation memory is changed, and
wherein:
the printer driver generator generates a new printer driver having the function to apply the changed permitted operation and a new authentication key, and transmits them to the information processing apparatus used by the user or section whose permitted operation is changed according to a judgment result drawn by the judger;
the controller of the information processing apparatus installs thereon the new printer driver and records the new authentication key in the authentication key memory of the information processing apparatus; and
the image forming apparatus records the new authentication key generated by the printer driver generator, in the authentication key memory of the image forming apparatus.

6. The image forming system recited in claim 5, wherein:
the printer driver generator transmits thereto the new printer driver and authentication key, together with the unique authentication key generated for the old version of printer driver;
the controller of the information processing apparatus compares the unique authentication key generated for the old version of printer driver, received from the printer driver generator, to the authentication key recorded in the authentication key memory of the information processing apparatus, and then replaces the old printer driver with the new one if the authentication keys are identical.

7. The image forming system recited in claim 2, wherein:
when the information processing apparatus transmits the job to the image forming apparatus, the printer driver generator judges whether or not the user who gave an instruction to execute the job uses the information processing apparatus that will receive the new version of printer driver, and if the user uses it, then the printer driver generator transmits the new version of printer driver and the new authentication key to the information processing apparatus, together with the unique authentication key generated for the old version of printer driver.

8. The image forming system recited in claim 1, wherein:
the controller of the information processing apparatus changes the unique authentication key generated for the printer driver, if a change occurs to the function of the printer driver to set permitted operations of the image forming apparatus.

9. The image forming system recited in claim 1, wherein:
if the authentication key given to the job received therefrom and the authentication key recorded in the authentication key memory of the image forming apparatus are not identical, the image forming apparatus transmits a notice telling that the authentication keys are not identical, to an administrator and/or the user who gave an instruction to execute the job.

10. The image forming system recited in claim 1, wherein:
the printer driver generator is provided in the image forming apparatus.

11. An image forming apparatus comprising:
a printer driver generator that generates a printer driver to set permitted operations of the image forming apparatus and a unique authentication key for the printer driver;
an authentication key memory that records in itself the authentication key generated by the printer driver generator;
a transmitter that transmits to an information processing apparatus, the printer driver and the authentication key generated by the printer driver generator;
a receiver that receives a job generated according to the printer driver and having the authentication key, from the information processing apparatus;
a comparator that compares the authentication key given to the job received therefrom, to the authentication key recorded in the authentication key memory; and
a job executor that executes the job received therefrom if the authentication keys are identical according to a comparison result drawn by the comparator.

12. The image forming apparatus recited in claim 11, wherein:
if the printer driver is upgraded, the printer driver generator generates a new version of printer driver and a new authentication key;
the transmitter transmits the new version of printer driver and the new authentication key to the information processing apparatus;
the authentication key memory records in itself the new authentication key; and
the comparator compares the new authentication key given to a job generated according to the new version of printer driver, received from the information processing apparatus, to the new authentication key recorded in the authentication key memory.

13. The image forming apparatus recited in claim 12, further comprising:
a detector that detects a user or section who uses the old version of printer driver, from a version memory that records in itself version information of the printer drivers by user or section, if the printer driver is upgraded, and
wherein:
the transmitter transmits the new version of printer driver and the new authentication key to the detected user's or section's image processing apparatus, together with the unique authentication key generated for the old version of printer driver.

14. The image forming apparatus recited in claim 12, further comprising:
a detector that detects a user or section whose permitted operations set using the new version of printer driver exist more than the user's or section's permitted operations recorded in a permitted operation memory that records in itself the permitted operations of the image forming apparatus, by user or section; and
a notifier that transmits to an administrator of the permitted operations, a request to change the permitted operations recorded in the permitted operation memory, set for the detected user or section.

15. The image forming apparatus recited in claim 11, further comprising:
a judger that judges whether or not any of the operations of the image forming apparatus, permitted for individual users or sections, recorded in a permitted operation memory, is changed, and
wherein:
the printer driver generator generates a new printer driver having the function to apply the changed permitted operation and a new authentication key, for the user or section whose permitted operation is changed according to a judgment result drawn by the judger;
the transmitter transmits the new printer driver and authentication key to the information processing apparatus used by the user or section whose permitted operation is changed;
the authentication key memory records in itself the new authentication key generated by the printer driver generator;
the comparator compares the new authentication key given to a job generated according to the new version of printer driver, received from the information processing apparatus, to the new authentication key recorded in the authentication key memory.

16. The image forming apparatus recited in claim 15, wherein:
the transmitter transmits the new printer driver and authentication key to the image processing apparatus, together with the unique authentication key generated for the old version of printer driver.

17. The image forming apparatus recited in claim 12, further comprising:
a judger judges whether or not the user who gave an instruction to execute the job uses the information processing apparatus that will receive the new version of printer driver, when the information processing apparatus transmits the job, and
wherein:
if the user uses it, the transmitter transmits the new version of printer driver and the new authentication key to the information processing apparatus, together with the unique authentication key generated for the old version of printer driver.

18. The image forming apparatus recited in claim 11, further comprising:
a notifier that transmits a notice telling that the authentication key given to the job received therefrom and the authentication key recorded in the authentication key memory are not identical, to an administrator and/or a user who instructed to execute the job, if the authentication keys are not identical according to a comparison result drawn by the comparator.

19. A non-transitory computer readable recording medium having a printer driver for setting operations of an image forming apparatus and generating a job to give to the image forming apparatus, the printer driver being customized for each user in terms of permitted functions, recorded therein to make a computer of an information processing apparatus execute:
giving to a job, a unique authentication key for the customized printer driver, when the job is generated;
transmitting the job having the authentication key, to the image forming apparatus;
changing the unique authentication key for the customized printer driver when the customized printer driver is modified in terms of permitted functions; and
comparing an-the unique authentication key generated for the customized printer driver, to a new printer driver, when the information processing apparatus receives the new authentication key and a new version of printer driver, and then replacing the customized printer driver with the new one if the authentication keys are identical.

* * * * *